April 21, 1964 W. J. HASSELBERG 3,130,023
GAS- AND AIR-MOISTURE SEPARATOR
Filed April 24, 1962 2 Sheets-Sheet 1
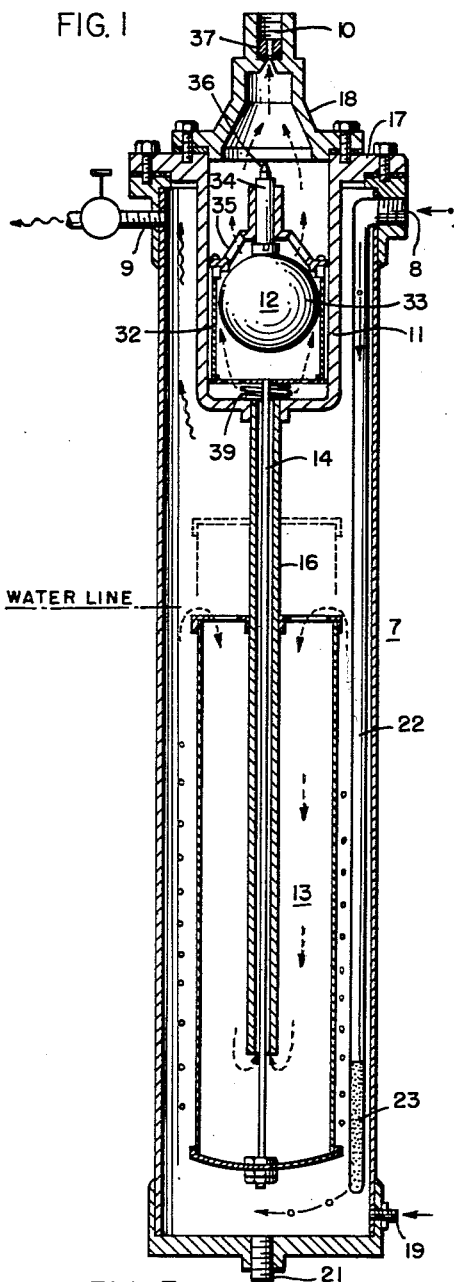
FIG. 1
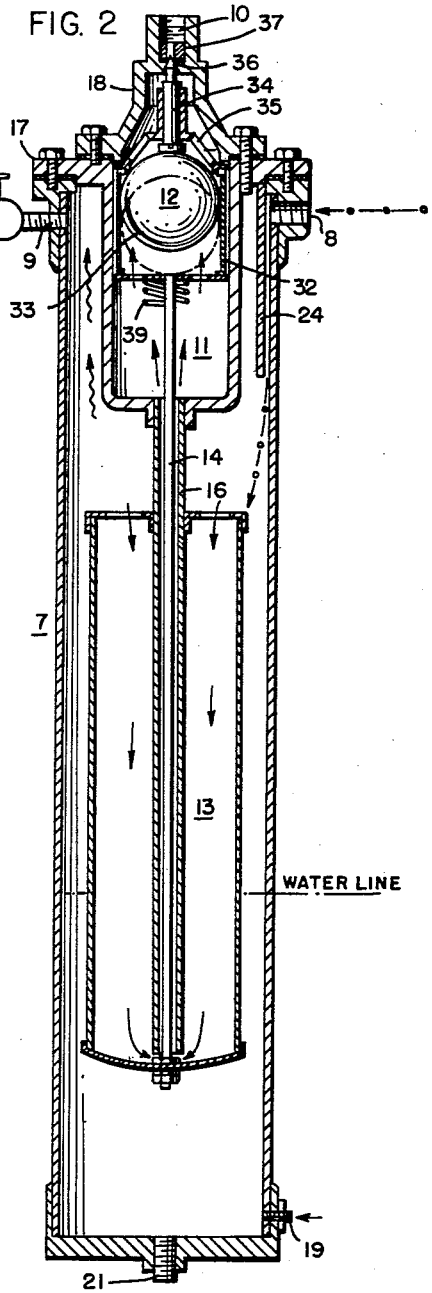
FIG. 2
FIG. 3
GAS PRESSURE "IN" —o—o—o—→
GAS PRESSURE "OUT" ～～～～
GAS PRESSURE AGAINST VALVE ⎯⎯⎯→
WATER FLOW "OUT" ⎯ ⎯ ⎯→
INVENTOR:
WILLIAM J. HASSELBERG
BY
ATT'YS

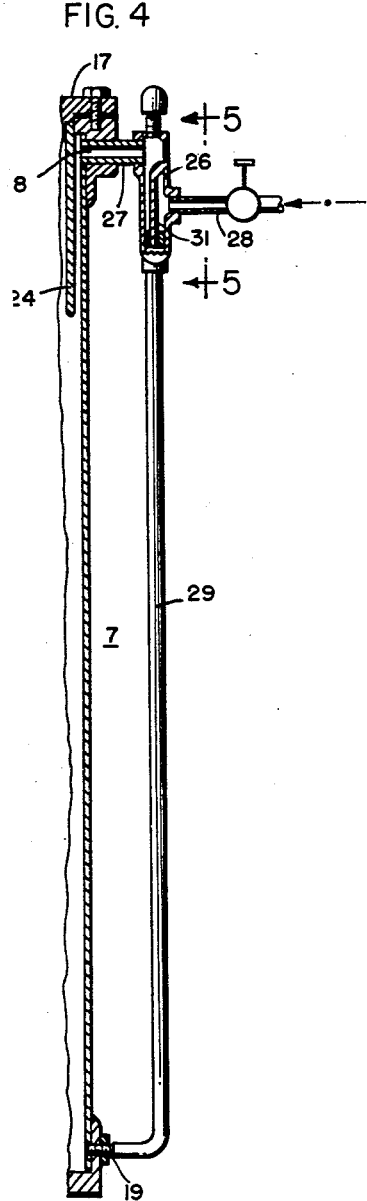
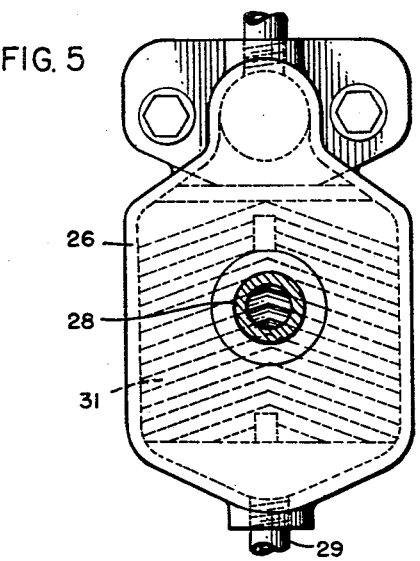

United States Patent Office 3,130,023
Patented Apr. 21, 1964

3,130,023
GAS- AND AIR-MOISTURE SEPARATOR
William J. Hasselberg, 1127 Troost Ave., Forest Park, Ill.
Filed Apr. 24, 1962, Ser. No. 189,786
3 Claims. (Cl. 55—219)

This invention relates to gas- and/or air-moisture separators.

The main objects of this invention are to provide an improved form of apparatus for use in extracting moisture from wet gas or wet air; to provide an improved apparatus of this kind especially adapted for use in breweries for separating the moisture from the carbon dioxide emanating from the fermentation process and collecting the extracted gas free of all moisture content; to provide an improved form of automatically-acting valve mechanism for controlling the recurring discharge of water accumulating in the separating-and-washing chamber; to provide an improved arrangement for introducing the wet gas into the gas-moisture separating chamber; and to provide an improved apparatus of this kind which is simple in construction and positive and silent in operation.

In the adaptation shown in the accompanying drawings:

FIGURE 1 is a vertical sectional elevation of a gas- and/or air-moisture separating apparatus constructed in accordance with this invention with one form of wet-gas inlet arrangement, the several parts being shown in their relative positions when water is being discharged during the normal operation of the separator;

FIG. 2 is a view similar to that of FIG. 1, equipped with a modified form of water-gas inlet, showing the several parts in their relative positions when the water outlet is shut off during the normal operation of the separator;

FIG. 3 is a diagrammatic explanation of the various forms of arrows shown in FIGS. 1 and 2;

FIG. 4 is a fragmentary, section detail showing a further modification of wet-gas inlet;

FIG. 5 is an enlarged partial sectional view taken on the line 5—5 of FIG. 4 and an elevational view of a herringbone type (shown in dash lines) of auxiliary separator that may be used in conjunction with a separator of this construction to eliminate excessive moisture from the gas in advance of its entrance into the separator constructed in accordance with this invention.

The essential concept of this invention involves a main housing having wet-gas inlet and dry-gas and water outlets and wherein is suspended below the water outlet a partitioned-off tank enclosing a float-valve assembly from which is suspended a water receptacle communicating with the tank through a concentric pipe depending from the tank.

A separator embodying the foregoing concept comprises a main housing 7 having a wet-gas inlet 8 and dry-gas and water outlets 9 and 10, respectively, and within which housing 7 is suspended a tank 11 enclosing a float-valve assembly 12 wherefrom a water receptacle 13 is suspended on a rod 14 and communicating with the tank 11 through a pipe 16 fixedly depending from the tank 11 and embracing the rod 14.

The main housing 7 preferably is cylindrical and is mounted on standards (not here shown). The upper end is sealed with a closure 17 to which is secured a cap 18 formed with the water outlet 10 therein. The closure 17 is a flange which is integrally formed and part of the upper end of the tank walls 11. As here shown, the wet-gas inlet 8 and the dry-gas outlet 9 are located at opposite sides of the housing 7, directly below the closure 17. Suitable valves are arranged to control the inlet 8 and the outlet 9. At the bottom of the housing 7 is a valve-controlled water-fill inlet 19 and a drain opening 21.

Various forms of connection can be made with the wet-gas inlet 8 interiorly or exteriorly of the housing 7 for facilitating the separation of the moisture from the incoming wet gas. In FIG. 1 a conduit 22 extends from the inlet 8 closely along the length of the housing 7 to a point just short of the bottom. The lower end of the conduit 22 mounts a perforated section 23 which tends to initiate the separation of the gas and moisture. In FIG. 2 a baffle 24 is suspended directly below the closure 17 closely adjacent the wet-gas inlet 8.

FIG. 4 illustrates an exterior supplemental gas-moisture separator in the form of a coupling 26 threaded to a nipple 27 in the gas inlet 8 and to a conduit 28 leading to the source of wet gas. A pipe 29 connects the coupling 26 with the water-fill inlet 19. An axially-disposed baffle 31 in the coupling 26 incorporating a herringbone design in the surface facing the inlet port of pipe 28 for deflecting the incoming wet-gas downwardly in the coupling 26 allowing any initially-separated moisture to enter through pipe 29 at the bottom of the housing 7 and then into the bottom of housing 7.

The tank 11 of FIGS. 1 and 2 here is shown integrated with the housing closure 17 and suspended therefrom about a quarter of the depth of the housing 7. To the bottom of this tank 11 is secured the pipe 16 which terminates a substantial distance above the bottom of the housing 7.

The float-valve assembly 12 comprises a cage 32, secured to the upper end of the rod 14 and enclosing a sphere 33. The cage 32 is cylindrical with open sides, top and bottom to permit water and gas flow therethrough, as will be explained presently. The cage 32 is of a length approximately half that of the tank 11. Two somewhat different forms of the cage 32 are shown in FIGS. 1 and 2, to accommodate differing structures of the sphere 33.

FIGS. 1 and 2 show the sphere 33 mounting a valve stem 34 axially shiftable in the crown 35 of the cage 11. The stem 34 has a tapered upper end 36 for conventional seating on an axially-bored bushing 37 to close the flow of water or gas through the outlet 10 when the receptacle 13 is in its upper buoyed position (FIG. 2).

The receptacle 13 here is shown of a diameter somewhat less than that of the housing 7 and of a length approximately half the length of the housing 7. The receptacle 13 is secured at its bottom to the lower end of the rod 14 depending from the float-valve cage 32 and disposed axially within the pipe 16. The receptacle 13 is open at the upper end to permit water flow therein from the housing 7 under conditions presently to be explained.

The respective lengths of the rod 14 and pipe 16 are such that in its lower position the bottom of the receptacle 13 is spaced an appreciable distance from the bottom of the housing 7 at a time when the cage 32 is at the lower limit of its travel in the tank 11. The upper position of the receptacle 13 is limited by the contact of the bottom of the receptacle 13 with the lower end of the pipe 16.

A spring 39, interposed between the bottom of the tank 11 and the cage 32 concentrically of the rod 14 cushions the descent of the receptacle 13 when filled with water sufficient to overcome the buoyancy of the water in the housing 7.

There are times when the gas arising from the fermentation process may have a very heavy moisture content. Under such conditions it has been found expedient to interpose a herringbone type of preliminary separator, such as shown in FIG. 5, in the conduit leading to the wet gas inlet 8 of the housing 7.

The operation of a separator, constructed in accordance with this invention, is as follows:

Once the housing 7 has all the connections made ready for its use, water is introduced into the housing through the water-fill inlet 19 to such a level in the housing 7 as will buoy the empty receptacle 13 to the position shown in FIG. 2. Such a water level will be approximately as indicated by the notation "water line" of FIG. 2.

Through the medium of the rod 14 such elevation of the receptacle 13 causes the float-valve cage 32 to rise to the upper limit of its movement in the tank 11, as shown in FIG. 2. At that time the sphere 33 will be resting on the bottom of the cage 32. However, as soon as the valve controlling the wet-gas inlet 8 is opened the cet gas will enter under a pressure ranging from 10 to 3000 p.s.i. and, ultimately, will be flowing through the housing 7 at a velocity of from 5 to 300 cubic feet per minute.

Almost instantly this incoming wet gas builds up a pressure in the housing 7 which flows down into the empty receptacle 13 and up through the pipe 16 into the tank 11. This initial pressure flow of the wet gas into the tank 11 snaps the sphere 33 upwardly to close the water outlet 10. Thereupon, the housing is sealed off ready for its automatic functioning in removing the moisture from the incoming wet-gas and extracting the dry gas and, periodically, discharging the accumulation of water in the housing 7.

However, to put the separator into such operation it is necessary to finally open the valve controlling the dry gas outlet 9. For a period of time, depending upon the moisture content of the incoming wet gas, the liquefied moisture begins to build up in the housing 7. This will cause a gradual rising of the water line in the housing 7 until it overflows into the receptacle 13. The water flow into the receptacle will continue until the weight thereof is sufficient to overcome the buoyancy of the receptacle 13. The instant that happens the receptacle 13 will descend quickly in the housing 7 to the point of its being checked by contact of the compressed spring 38 against the bottom of the tank 11, as is shown in FIG. 1.

The consequent reaction of the float-valve assembly 12 lowers the sphere 32 so as to open the water outlet 10. The pressure of the gas in the housing 7, above the water level therein, initiates an upward flow of water through the pipe 16 into the tank 11 and out through the outlet 10. The discharge of water will continue until a sufficient quantity of the water has been removed from the receptacle 13 as to again allow it to become buoyant in the remaining water in the housing 7. The rising receptacle 13 is likely to be as rapid as was its prior descent, with the result that the cage 32 will be elevated to its uppermost position in the tank 11. Thereupon the continuing pressure of the incoming wet-gas on the small quantity of water remaining in the bottom of the receptacle 13 will cause an elevation of the sphere 33 to close the water outlet 10 to any escape of gas therethrough.

Meanwhile, the dry gas is being discharged through the dry-gas outlet 9 under substantially the same pressure tank velocity as that of the entering wet gas. Such discharged gas is collected in suitable containers.

Such a cycle of water collection in and discharged from the housing 7 continues automatically so long as the valves controlling the wet-gas inlet 8 and the dry-gas outlet 9 remain open. The closing of either or both of these valves arrests further operation of the separator.

Although but one specific embodiment of this invention is herein shown and described it will be understood that details of the construction shown may be altered or omitted without departing from the spirit of the invention as defined by the following claims.

I claim:
1. A moisture-gas separator comprising,
   (a) a main housing having
      a wet-gas inlet
      a dry-gas outlet, and
      a water outlet,
      and a water fill inlet for maintaining a predetermined water level in said housing
   (b) a tank
      fixedly suspended in the upper end of the housing and having direct communication with the water outlet, and
      having a pipe
         depending therefrom to a point above the bottom of the housing, and
         confining thereto water flow between the housing and the tank,
   (c) a cage
      reciprocable in the tank and
      suspending a rod
         enclosed in the pipe of a length to extend below the end of the tank pipe, and having openings therein for the flow of water therethrough,
   (d) a float valve
      enclosed within the cage and freely shiftable vertically between retracted and
         elevated positions in the cage for controlling water flow through the water outlet,
   (e) a receptacle
      having its lower end extending below said water level having an opening in its upper end, and being materially less in length than the housing and positioned below the tank,
      reciprocably suspended within the housing from the lower end of the cage rod
      to retract the cage within the tank when the water in the housing overflows into the receptacle to depress its position, and
      to elevate the cage within the tank when the incoming gas pressures the water from the receptacle to effect its elevation in the housing, whereby the continuing pressure of the incoming gas on the water in the receptacle activates the float valve to close the water outlet.

2. A moisture-gas separator as set forth in claim 1 wherein the float valve is in the form of a hollow sphere and mounts a needle-end stem axially shiftable on the cage to dispose the pointed end to seat in the housing water outlet.

3. A moisture-gas separator as set forth in claim 1 wherein the tank is integrated with top closure bolted to the housing and mounting a removable cap wherein is formed the water outlet.

References Cited in the file of this patent
UNITED STATES PATENTS

| | | |
|---|---|---|
| 1,463,769 | Wood | July 31, 1923 |
| 1,521,386 | Neill | Dec. 30, 1924 |
| 1,807,882 | Smelser | June 2, 1931 |
| 2,037,245 | Leifheit et al. | Apr. 14, 1936 |
| 2,710,666 | May | June 14, 1955 |